(12) United States Patent
Vézain et al.

(10) Patent No.: US 10,858,125 B2
(45) Date of Patent: Dec. 8, 2020

(54) DEVICE FOR CONNECTING OBJECTS USING A STRIP

(71) Applicant: THALES, Courbevoie (FR)

(72) Inventors: Stéphane Vézain, Mandelieu (FR);
Carole Billot, Cannes la Bocca (FR);
Didier Stanek, Cannes la Bocca (FR);
Yannick Baudassé, Cannes la Bocca (FR)

(73) Assignee: THALES, Courbevoie (FR)

( * ) Notice: Subject to any disclaimer, the term of this patent is extended or adjusted under 35 U.S.C. 154(b) by 747 days.

(21) Appl. No.: 15/529,056

(22) PCT Filed: Dec. 4, 2015

(86) PCT No.: PCT/EP2015/078615
§ 371 (c)(1),
(2) Date: May 23, 2017

(87) PCT Pub. No.: WO2016/087629
PCT Pub. Date: Jun. 9, 2016

(65) Prior Publication Data
US 2017/0259945 A1    Sep. 14, 2017

(30) Foreign Application Priority Data

Dec. 5, 2014 (FR) ...................................... 1402778

(51) Int. Cl.
*B64G 1/22* (2006.01)
*B64G 1/64* (2006.01)

(52) U.S. Cl.
CPC ............... *B64G 1/222* (2013.01); *B64G 1/22* (2013.01); *B64G 1/64* (2013.01); *B64G 1/646* (2013.01); *B64G 1/648* (2013.01)

(58) Field of Classification Search
CPC .......... B64G 1/646; B64G 1/222; B64G 1/44;
B64G 1/503; B64G 1/648; B64G 1/66;
B64G 1/1078; B64G 1/242; B64G 1/64;
B64G 1/22; B64G 1/28; B64G 1/10;
F41F 1/00; F41F 7/00; F41B 11/80; F41B
11/83; F41B 11/60; F42B 10/26; F42B
30/14; F42B 12/68
See application file for complete search history.

(56) References Cited

U.S. PATENT DOCUMENTS 2,839,862 A    6/1958  Hanshaw
4,500,057 A *  2/1985  Duwelz .................. B64G 1/646
                                                244/115

(Continued)

FOREIGN PATENT DOCUMENTS

EP    2 671 804 A1    12/2013
EP    2 740 669 A1    6/2014
FR    2 528 385 A1    12/1983

*Primary Examiner* — Richard R. Green
*Assistant Examiner* — Steven J Shur
(74) *Attorney, Agent, or Firm* — BakerHostetler (57) ABSTRACT

A link device comprising a first object and a second object comprises a first strip, capable of passing from a configuration wound about an axis Z about a support fixed to the first object to a configuration deployed along an axis X substantially at right angles to the axis Z, the strip having an end intended to come into contact with the second object, so as to link the first object to the second object.

6 Claims, 10 Drawing Sheets

(56) References Cited

U.S. PATENT DOCUMENTS

| | | | | |
|---|---|---|---|---|
| 4,750,692 A | * | 6/1988 | Howard | B64G 1/648 |
| | | | | 102/504 |
| 5,364,046 A | * | 11/1994 | Dobbs | B64G 1/646 |
| | | | | 244/172.4 |
| 2004/0173197 A1 | | 9/2004 | Moffitt | |

* cited by examiner

DEVICE FOR CONNECTING OBJECTS USING A STRIP

CROSS-REFERENCE TO RELATED APPLICATIONS

This application is a National Stage of International patent application PCT/EP2015/078615, filed on Dec. 4, 2015, which claims priority to foreign French patent application No. FR 1402778, filed on Dec. 5, 2014, the disclosures of which are incorporated by reference in their entirety.

FIELD OF THE INVENTION

The present invention relates to a device for linking objects by a strip. It applies to any field for linking a first object to a second object. The invention can be applicable for sending a projectile from a first object. The invention applies in particular to the space domain. The invention relates also to a cannon and a device for rotating a projectile.

BACKGROUND

The amount of space debris, both large and small, is constantly increasingly. The increasing amount of space debris is leading to an increase in the risk of collisions between satellites and/or with a space station. Some debris is deemed critical because of its size and/or positioning in areas called at-risk areas, for example a useful orbit. Examples that can be cited include a failing satellite, rocket stages, potentially positioned on a useful orbit. Removing such debris from orbit is becoming an urgent issue to separate it from the useful orbit. There is then the issue of knowing how to remove from space this debris to clear effectively and safely. In effect, it is essential to provide a rig and maneuvers that are reliable to remove the debris to eliminate the risk of generating undesirable collisions and thus even more debris.

Various solutions have been suggested. Those that can be cited include an articulated arm for grasping the debris, a gigantic net or a robot vehicle intended to catch the debris and bring it back to Earth or to park it in a so-called parking orbit, far from the useful orbits. These solutions are costly and difficult to implement.

Another solution consists in harpooning the target object concerned, namely the debris, to pull it out of the at-risk area. One major problem concerns the stability of the harpoon. In effect, the Earth's atmosphere, that can be considered as a viscous medium, generates air resistance. On the contrary, in space, that is to say in an almost perfect vacuum, an object moving therein is almost totally free of air resistance. The result thereof is that there is no aerodynamic effect on this object. In other words, in the vacuum, the aerodynamic effects cannot be counted upon to maintain the orientation of the harpoon in the axis of its trajectory. Once launched, the harpoon, generally held by a cable, is then no longer directed in the desired direction toward the target object. It is therefore essential to take into account additional constraints linked to the space domain in designing the solution for the device intended to harpoon the target object. Furthermore, the link between the harpoon and the target object (that is to say the debris) can create disturbances in the trajectory of the harpoon in the unwinding of the cable. And the cable can also become entangled when it is stowed away.

SUMMARY OF THE INVENTION

The invention aims to mitigate all or some of the problems cited above by proposing a device consisting in linking a first object to a second object, the projectile, without a winding problem, that is to say a link device that makes it possible to link a first object to the projectile by means of strip capable of being wound and unwound in such a way as not to hamper the trajectory of the projectile.

To this end, the subject of the invention is a link device comprising a first object and a second object, characterized in that it comprises a first strip, capable of passing from a configuration wound about an axis Z about a support fixed to the first object to a configuration deployed along an axis X substantially at right angles to the axis Z, the strip having an end intended to come into contact with the second object, so as to link the first object to the second object.

According to one embodiment, the end of the first strip is linked to the second object by a link element, and the link element is a mechanical component allowing the rotation of the second object about the axis X.

According to another embodiment, the link device comprises a first flange and a second flange positioned substantially parallel to the plane XY, on either side of the first strip.

According to another embodiment, the link device comprises a cover positioned around the first strip.

According to another embodiment, the link device further comprises a motor having an output shaft along the axis Z linked to the support, intended to wind and deploy the first strip.

According to another embodiment, the link device comprises a guiding device for the first strip.

According to another embodiment, the link device comprises a cutting device intended to cut the first strip.

According to another embodiment, the link device comprises a second strip superposed on the first strip, capable of passing from a configuration wound about the axis Z about the support fixed to the first object to a configuration deployed along the axis X substantially at right angles to the axis Z, the second strip having an end intended to come into contact with a third object, so as to link the first object to the third object.

BRIEF DESCRIPTION OF THE DRAWINGS

The invention will be better understood and other advantages will become apparent on reading the detailed description of an embodiment given by way of example, the description being illustrated by the attached drawing in which.

In the interests of clarity, the same elements will bear the same references in the different figures.

DETAILED DESCRIPTION

Note that the invention is described in the context of a use in the space domain. Nevertheless, it is also applicable in the Earth's atmosphere, for example on a ship, for retrieving debris from in the water or floating on the surface of the water, or on land in order to pull an object.

And more generally, the invention is applicable in all the particular cases where a first object is linked to a second object.

Figure 1:
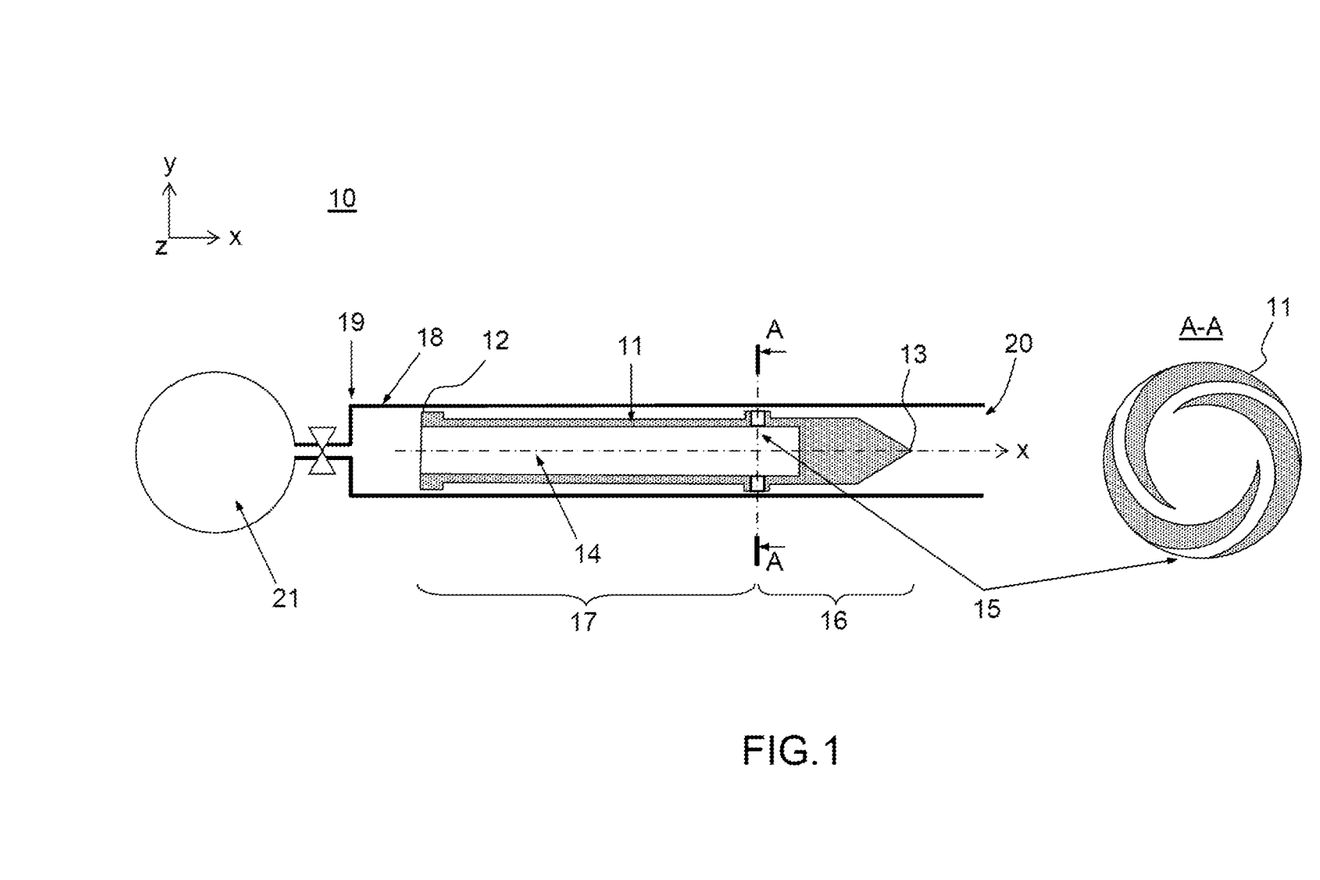
FIG. 1 represents a cross-sectional diagram in a plane XY of a first embodiment of a device for launching a projectile, and a cross-sectional view of a section of the projectile in a plane YZ at right angles to the plane XY.

FIG. 1 represents a diagram, in cross section in a plane XY, of a first embodiment of a device 10 for launching a projectile 11, and a cannon 18, as well as a cross-sectional view of a section of the projectile 11 in a plane YZ at right angles to the plane XY. The projectile 11 extends along an axis X between two ends 12, 13. The projectile 11 is to be positioned in the substantially cylindrical cannon 18 of axis X. The projectile 11 comprises a hollow part 14 at its center emerging at a first end 12 of the two ends of the projectile 11, intended to receive a compressed fluid. The projectile 11 comprises a plurality of vents 15 passing through the projectile 11 from the hollow part 14 substantially at right angles to the axis X and with substantially radial outlet, intended to expel the compressed fluid substantially tangentially to the projectile 11. Preferably, but not necessarily, the compressed fluid can be a compressed gas. The compressed fluid enters into the projectile 11 through the hollow part 14 and leaves tangentially to the section of the projectile 11 through the vents 15. The outlet of the compressed fluid tangentially to the section of the projectile 11 through the vents 15 creates a torque on the projectile which makes it rotate on itself. In other words, the projectile 11 is made to rotate on itself, about the axis X. On entering into the projectile 11, the compressed fluid causes an increase in pressure in the projectile. This increase in pressure generates a translation of the projectile along the axis X, which allows a projection of the projectile 11. At the same time, the pressure of the fluid and the flow of the fluid in the vents generate a rotation of the projectile on itself. Thus, the hollow part 14 and the vents 15 of the projectile 11 allow both a translation motion along the axis X and a rotational motion about the axis X of the projectile 11. In the cross-sectional view in the plane YZ of FIG. 1, the projectile 11 comprises three vents. To make the projectile 11 rotate correctly, at least two vents are needed, but it is also possible to have three or more thereof.

The projectile 11 comprises a head 16 and a body 17. The head 16 of the projectile 11 extends from a second 13 of the two ends of the projectile 11 to the plurality of vents 15. The body 17 of the projectile 11 extends from the head 16 to the first end 12 of the projectile 11.

The cannon 18 has two ends 19, 20, in which cannon the projectile 11 is positioned, a first 19 of the two ends of the cannon 18 allowing the compressed fluid to enter into the cannon 18, a second 20 of the two ends allowing the projectile 11 to leave.

Finally, the device 10 for rotating the projectile 11 comprises a tank 21 of compressed fluid linked to the first end 19 of the cannon 18 in which the projectile 11 is located, so as to supply the projectile 11 with compressed fluid.

Figure 2A:
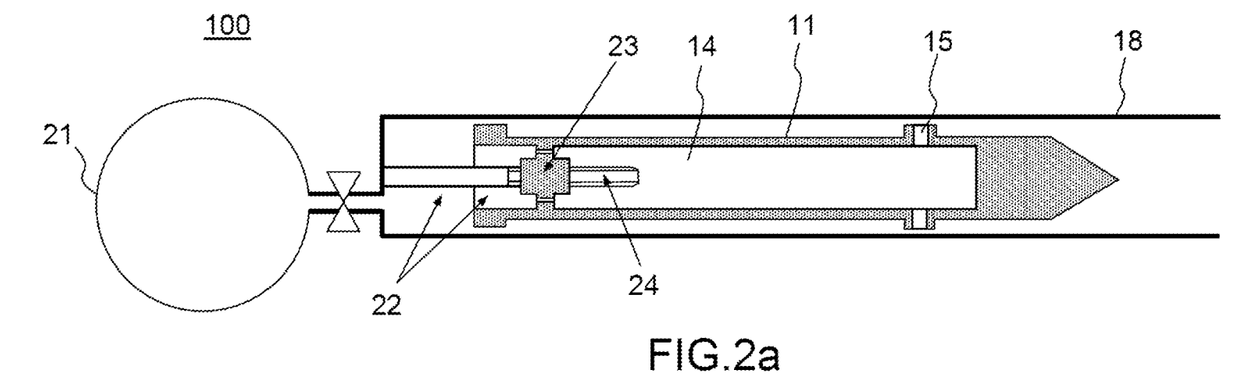
FIGS. 2a and 2b represent a diagram, in cross section in the plane XY, of a second embodiment of a device for launching the projectile.
Figure 2B:
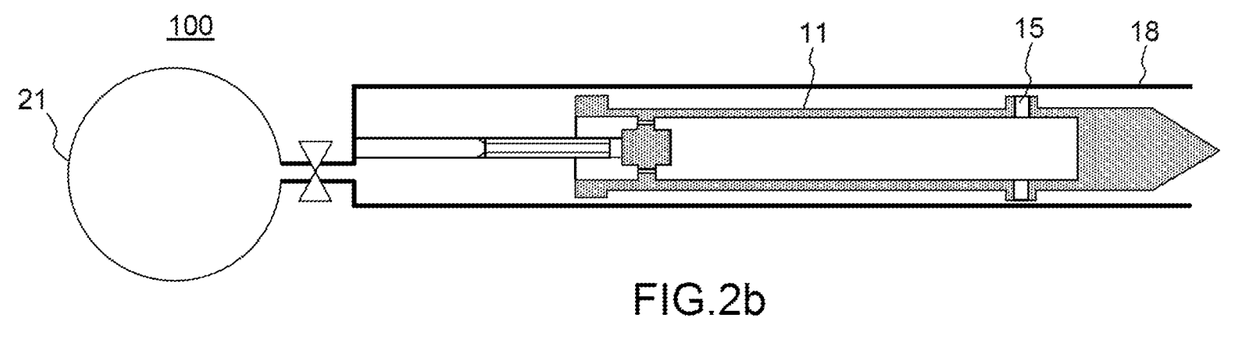

FIGS. 2a and 2b represent a diagram, in cross section in the plane XY, of a second embodiment of a device 100 for launching the projectile 11. The cannon 18 comprises a first 23 of two helical link elements 23, 24. The projectile 11 comprises a second 24 of two helical link elements 23, 24 fixed in the hollow part 14 of the projectile 11, the first 23 and the second 24 helical link elements forming a combined motion mechanism 22, so as to simultaneously generate a rotation about the axis X and translation along the axis X of the projectile 11 relative to the cannon 18. The combined motion mechanism 22 can be a screw-nut assembly, or preferentially an assembly with a ball screw or roller screw to limit the friction between the two link elements 23, 24. The pressure of the compressed fluid thrusts the projectile 11 out of the cannon 18. As has already been seen previously, the vents 15 with substantially radial outlet make it possible to generate a rotational motion about the axis X of the projectile 11. Now, since the desire is for the projectile to maintain its trajectory in its axis, trajectory along the axis X, it is desirable for it to be correctly accelerated in rotation about its axis X for it to always remain oriented in the same direction. One of the two elements 23 or 24 can be likened to a threaded rod and the other of the two elements 23 or 24 can be likened to a nut. Depending on the number N of turns over which the nut is engaged on the threaded rod, the projectile 11 will perform the same number N of turns on itself, therefore a motion of N rotations, as represented in FIG. 2a, before being freed in translation and being able to be ejected, as represented in FIG. 2b. The link mechanism 22 therefore allows the projectile 11 to acquire a greater angular acceleration about the axis X before accelerating in translation along the axis X.

It should be noted that, in FIGS. 2a and 2b, the screw is fixed to the cannon 18 and the nut in the hollow part 14 of the projectile 11. Nevertheless, it is perfectly possible to reverse them, that is to say to fix the screw in the hollow part 14 of the projectile 11 and the nut to the cannon 18.

Figure 3:
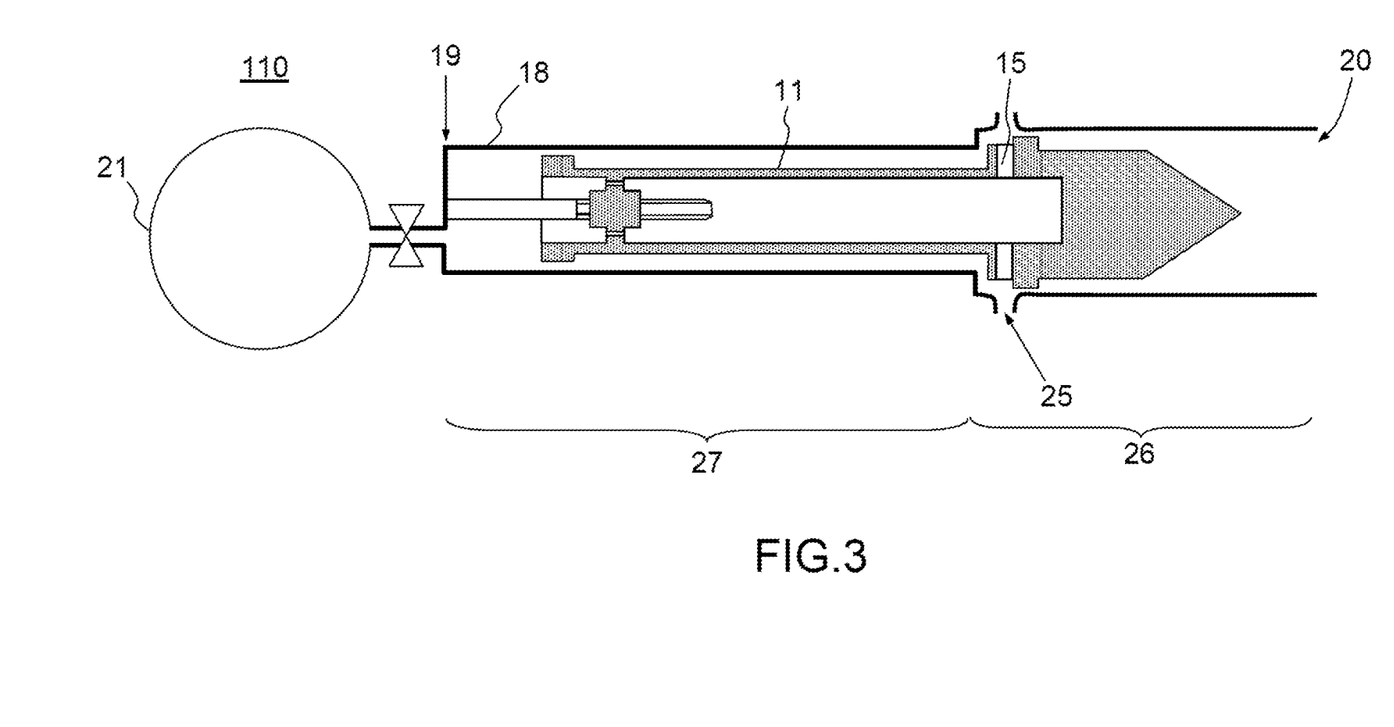
FIG. 3 represents a diagram, in cross section in the plane XY, of a third embodiment of a device for launching the projectile.

FIG. 3 represents a diagram, in cross section in the plane XY, of a third embodiment of a device 110 for launching the projectile 11 comprising the cannon 18. The cannon 18 comprises a first substantially radial opening 25. This substantially radial opening 25 allows the compressed fluid to leave the cannon 18 after it has flowed through the projectile 11.

The cannon 18 comprises a head 26 and a body 27, the head 26 of the cannon 18 extending from the second 20 of the two ends of the cannon 18 to the opening 25, the body 27 of the cannon 18 extending from the head 26 of the cannon 18 to the first 19 of the two ends of the cannon 18.

It can be noted also that the diameter of the body 27 of the cannon 18 is smaller than the diameter of the head 26 of the cannon 18. Furthermore, the diameter of the body 17 of the projectile 11 is smaller than the diameter of the head 16 of the projectile 11. And the diameter of the body 17 of the projectile 11 is smaller than the diameter of the body 27 of the cannon 18 and the diameter of the head 16 of the projectile 11 is smaller than the diameter of the head 26 of the cannon 18.

In other words, the diameter of the head 26 of the cannon 28 is substantially greater than the diameter of the head 16 of the projectile 11, and the diameter of the body 27 of the cannon 18 is substantially greater than the diameter of the body 17 of the projectile 11.

This difference in diameters between the bodies and the heads respectively constitutes a guiding system for the projectile 11. In effect, since the bodies correspond to a first diameter smaller than a second diameter corresponding to that of the heads, upon its ejection, the projectile 11 is simultaneously released at the level of the body and of the head. This configuration thus avoids any disturbance in the trajectory of the projectile 11 which could be generated by vibrations in the cannon.

Figure 4A:
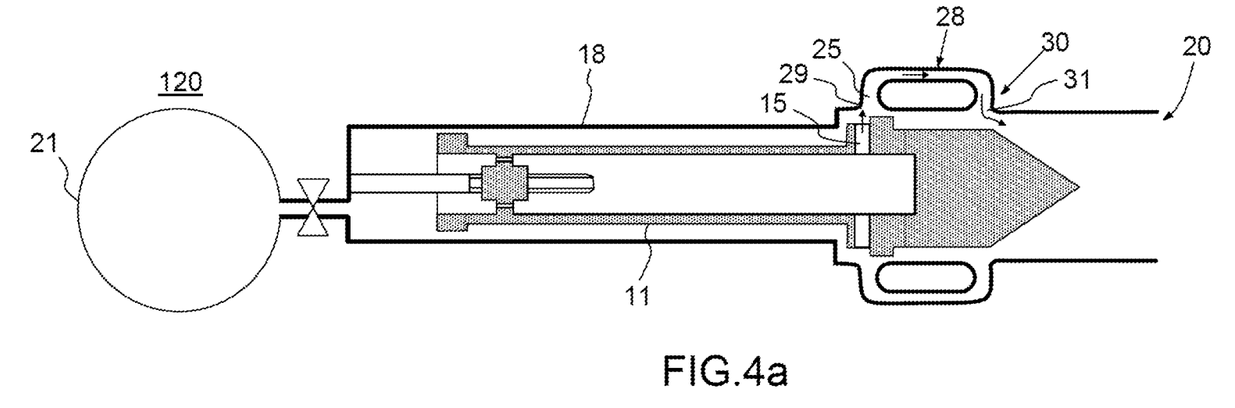
FIGS. 4a and 4b represent a diagram, in cross section in the plane XY, of a fourth embodiment of a device for launching the projectile.
Figure 4B:
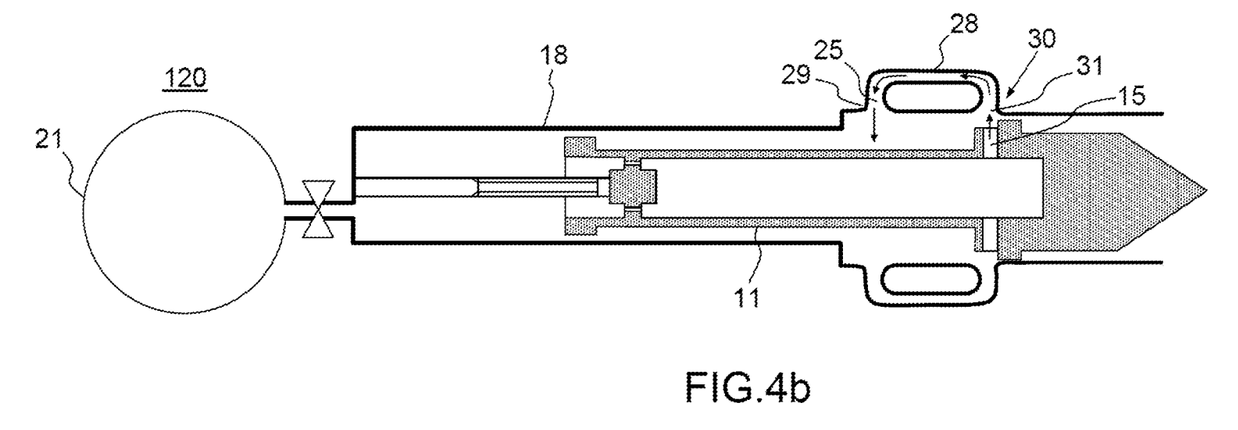

FIGS. 4a and 4b represent a diagram, in cross section in the plane XY, of a fourth embodiment of a device 120 for launching the projectile 11 comprising the cannon 18. The cannon 18 comprises a discharge duct 28 having two ends 29, 30. The cannon 18 comprises a second opening 31 between the first opening 25 of the cannon 18 and the second 20 of the two ends of the cannon 18. A first 29 of the two ends of the discharge duct 28 is linked to the first opening 25 of the cannon 18 and a second 30 of the two ends of the discharge duct 28 is linked to the second opening 31 of the cannon 18. The compressed fluid, having a certain pressure and a certain flow rate, will, after its passage through the projectile 11, have to be discharged from the cannon 18. As explained previously with FIG. 3, the compressed fluid can simply be discharged through the radial opening 25 of the cannon 18. In this case, the compressed fluid is released outward (to space, atmosphere, that is to say into the place of use of the device for rotating the projectile). It is also possible to use the discharge of the compressed fluid to generate an aerodynamic effect on the projectile 11, as shown in FIGS. 4a and 4b. In FIG. 4a, the projectile 11 is in an angular acceleration phase. The combined motion mechanism 22 promotes the rotational acceleration of the projectile 11 and the radial opening 25 is located substantially opposite at least one vent 15. The compressed fluid leaves the projectile 11 through the vent, generates a torque on the projectile 11, and makes it rotate on itself. The compressed fluid then enters into the discharge duct 28 through the first end 29 (that is to say through the radial opening 25) and re-emerges from the discharge duct 28 through the second end 30 (that is to say the second opening 31). As represented in FIG. 4b, in the phase of translation along the axis X, the link elements 23, 24 of the combined motion mechanism 22 being freed from one another, that is to say the projectile 11 having acquired a sufficient angular acceleration, the projectile 11 moves to the end 20 of the cannon 18. The vents 15 are then located opposite the second end 30 of the discharge duct 28. The compressed fluid then enters into the discharge duct 28 through the second end 30 and re-emerges from the discharge duct 28 through the radial opening 25 at the first end 29 of the discharge duct 28. The flow of the compressed fluid to the body 27 of the cannon 18 will generate an increase in pressure in the body 27 of the cannon 18 and thus generate an additional force on the projectile along the axis X, promoting the translational acceleration along the axis X of the projectile 11.

Figure 5:
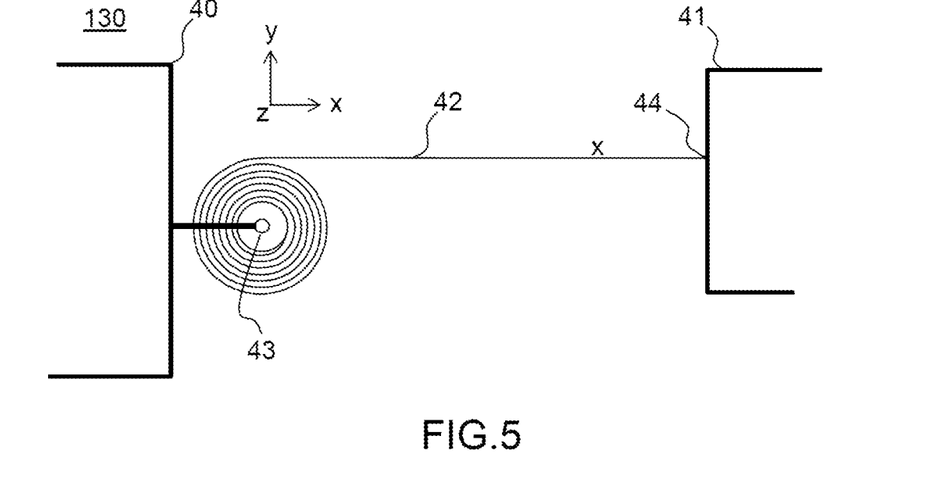
FIG. 5 represents a diagram, in cross section in the plane XY, of a first embodiment of a link device intended to link a first object to a second object according to the invention.

FIG. 5 represents a diagram, in cross section in the plane XY, of a first embodiment of a link device 130 according to the invention comprising a first object 40, a second object 41. The link device 130 comprises a first strip 42, capable of passing from a configuration wound about an axis Z about a support 43 fixed to the first object 40 to a configuration deployed along an axis X substantially at right angles to the axis Z, the strip 42 having an end 44 intended to come into contact with the second object 41, so as to link the first object 40 and the second object 41.

A strip winds and unwinds easily, with a minimum bulk in wound configuration, because it is wound about the axis Z and substantially in the plane XY, which avoids having the strip become entangled. Nevertheless, it is also possible to consider a cable or a cord instead of the strip, the cable or the cord, just like the strip 42, being able to pass from a configuration wound about the axis Z about the support 43 fixed to the first object 40 to a configuration deployed along the axis X.

Figures 6A, 6B:
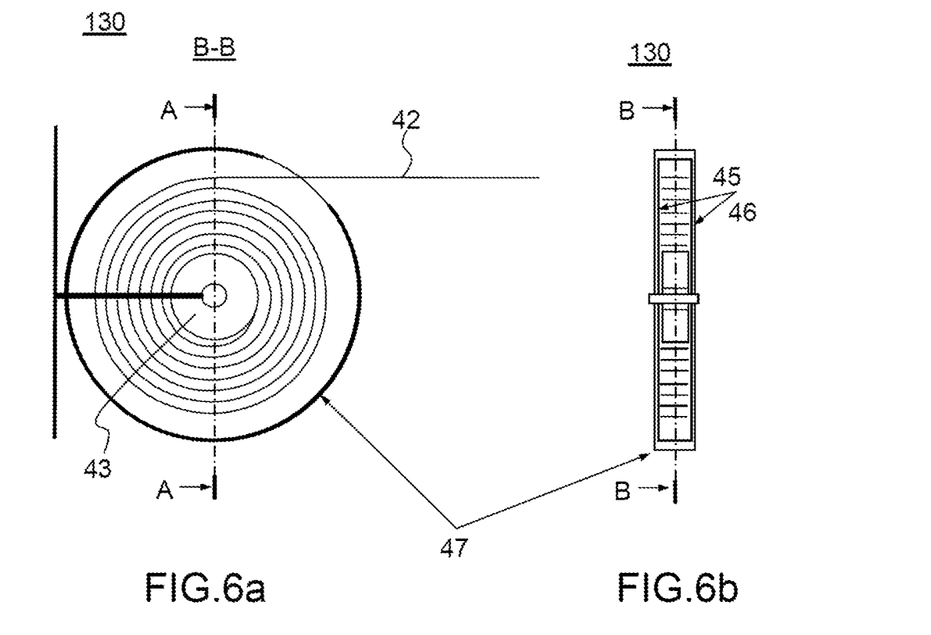
FIGS. 6a and 6b represent a diagram, in cross section in the plane XY, of a second embodiment of the link device according to the invention.

FIGS. 6a and 6b represent a diagram, in cross section in the plane XY, of a second embodiment of the link device 130 according to the invention. The link device 130 comprises a first 45 and a second 46 flange positioned substantially parallel to the plane XY, on either side of the first strip 42, and a cover 47 positioned around the first strip 42. The two flanges 45, 46 allow the strip 42 not to leave its winding when the strip 42 unwinds. The cover 47 also avoids having the strip 42 unwind too much. In effect, it is sometimes necessary to have a certain length of strip 42 rapidly available to come into contact with the second object 41 or pull it. In this case, it may be necessary to unwind the strip 42 between the two flanges 45, 46, for example 5 to 20 meters of strip 42, and the cover 47 makes it possible to keep this unwound length around the support 43. These examples can be seen in FIGS. 7a and 7b.

Figure 7A:
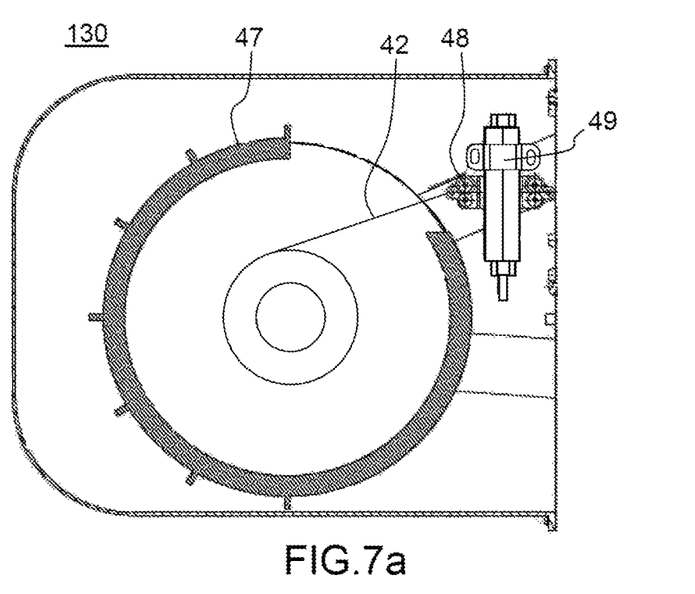
FIGS. 7a and 7b represent a diagram, in cross section in the plane XY, of a third embodiment of the link device according to the invention.
Figure 7B:
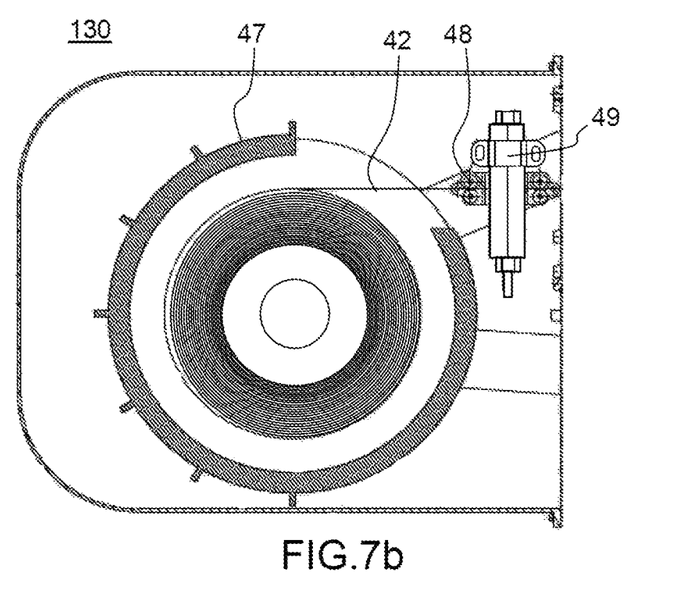

FIGS. 7a and 7b represent a diagram, in cross section in the plane XY, of a third embodiment of the link device according to the invention. The link device 130 comprises a guiding device 48 for the first strip 42. The guiding device 48 can consist of two simple bearing surfaces on either side of the strip 42 to guide it in its deployment. The simple bearing surfaces can be rollers forming a one-off link on the strip 42 or fingers forming a longitudinal link on the width of the strip 42.

Furthermore, the link device 130 can comprise a cutting device 49 intended to cut the first strip 42. Such cutting may be necessary if there is no longer a desire to come into contact with the second object or if there is no longer a desire to pull it for safety or maneuverability reasons. The cutting device can be a pyrotechnic cutter or any other suitable type of cutter.

Figure 8:
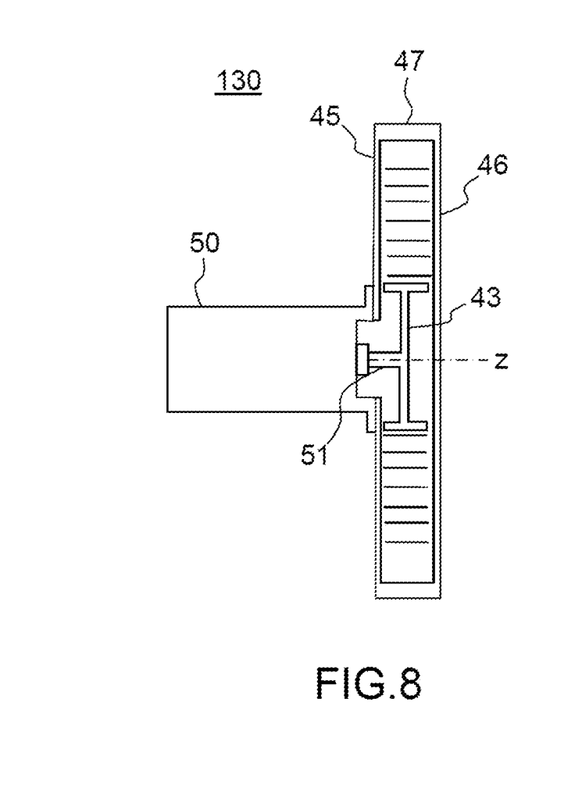
FIG. 8 represents a diagram, in cross section in the plane XY, of a fourth embodiment of the link device according to the invention.

FIG. 8 represents a diagram, in cross section in the plane XY, of a fourth embodiment of the link device 130 according to the invention. The link device 130 can further comprise a motor 50 having an output shaft 51 along the axis Z linked to the support 43, designed to wind and deploy the first strip 42.

Figure 9:
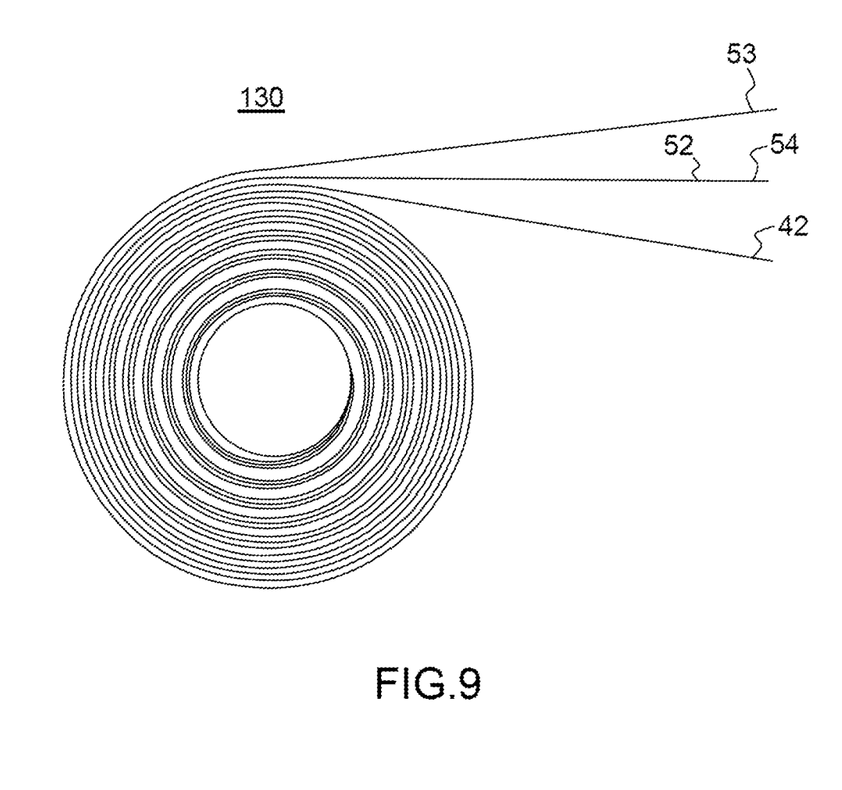
FIG. 9 represents a diagram, in cross section in the plane XY, of a fifth embodiment of the link device according to the invention.

FIG. 9 represents a diagram, in cross section in the plane XY, of a fifth embodiment of the link device 130 according to the invention. The link device 130 can comprise at least one second strip 52 superposed on the first strip 42, capable of passing from a configuration wound about the axis Z about the support 43 fixed to the first object 40 to a configuration deployed along the axis X substantially at right angles to the axis Z, the strip 52 having an end 54 intended to come into contact with a third object (not represented), so as to link the first object 40 and the third object. The strip 52 is superposed on the strip 42. Similarly, a third strip 53 can be wound about the support 43 by being superposed on the strips 42 and 52. This strip winding configuration is advantageous since it makes it possible to wind several strips intended to come into contact with several objects, with a minimum bulk. Similarly, the invention relates also to a configuration in which the link device 130 comprises four strips, or more, superposed with one another and making it possible to link a fifth object, or more, to the first object 40.

Figure 10:
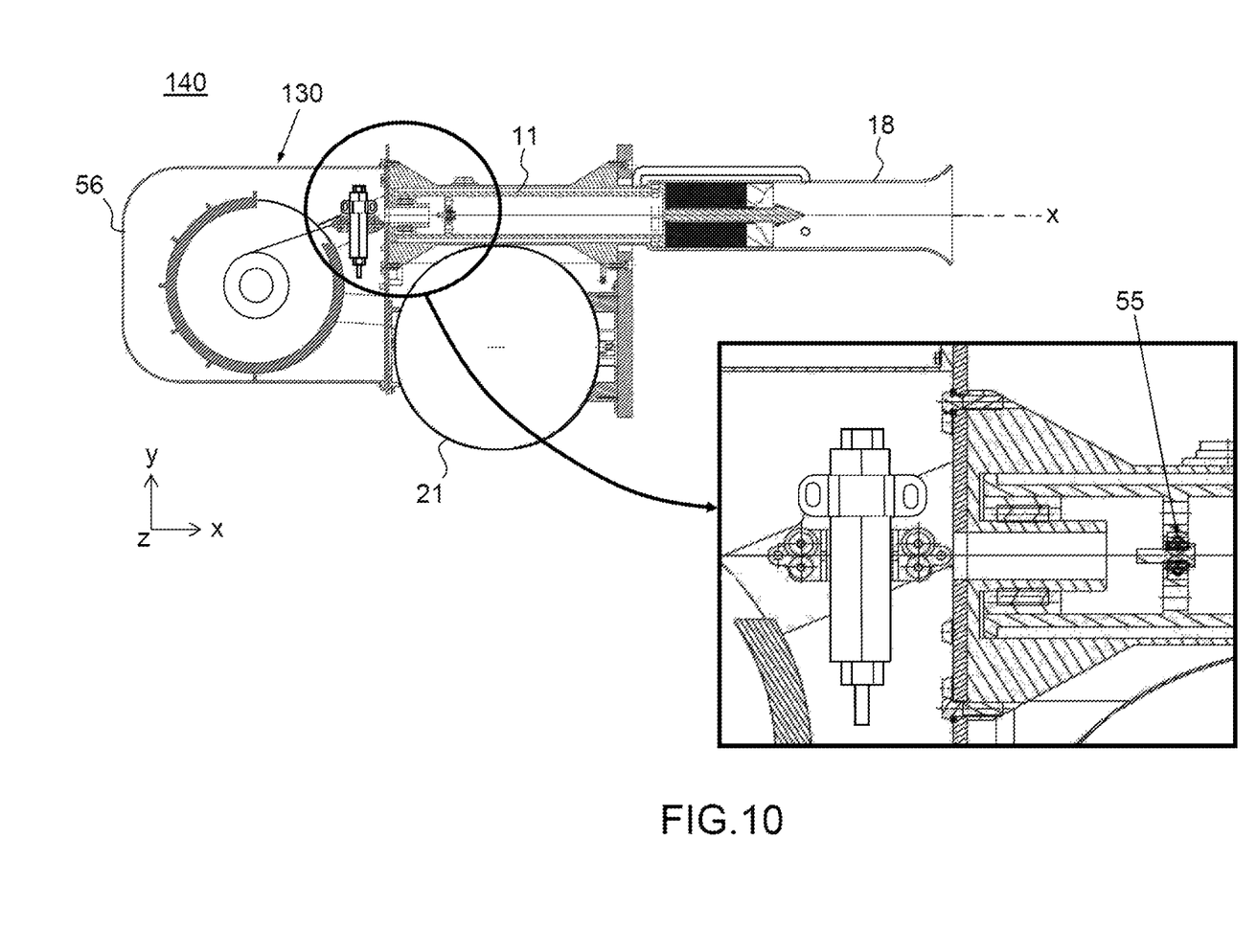
FIG. 10 represents a diagram, in cross section in the plane XY, of a fifth embodiment of the device for launching a projectile including a link device.

FIG. 10 represents a diagram, in cross section in the plane XY, of a fifth embodiment of a device 140 for launching a projectile by compressed fluid comprising the cannon 18, a tank 21 of compressed fluid linked to the first 19 of the two ends of the cannon 18. The launching device 140 comprises a link device 130 described previously, the projectile 11 then being the second object 41. The support 43 is fixed to the device 140. The end 44 of the first strip 42 is linked to the second object, that is to say to the projectile 11, by a link element 55. The link element 55 is a mechanical component allowing the rotation of the projectile 11 about the axis X. It can be a ball bearing allowing the rotation about the axis X of the projectile 11. Thus, the link device 130 allows, at the same time as the strip is being deployed to send the projectile, its rotation on itself (spin). In space, for the recovery of space debris, in order to ensure the safety of the catcher, it is necessary to be positioned several hundreds of meters away from the satellite to be harpooned. Because of this, it is impossible to harpoon with a harpoon of terrestrial type which is simply unwound. In other words, it is necessary to have the combination of the unwinding of the strip and the spin of the projectile or harpoon. In effect, in space, there is no aerodynamic effect making it possible to maintain the orientation of the harpoon in the axis of its trajectory. Once launched, the harpoon, held by the strip and by virtue of its rotation on itself, is directed in the desired direction toward the target object. This configuration makes it possible to obtain a small bulk when the strip is wound about its support, and by virtue of the rotation of the projectile on itself, it is possible to harpoon debris while being positioned at a great distance. Since the rotation of the projectile on itself allows it to be kept in the axis of its trajectory, there is no need for the strip to have a particular rigidity such as a strut. In addition to the low cost that this solution represents, it is also easy to implement.

The support 43 is fixed in the cannon 18. Advantageously, the support 43 is fixed near the first 19 of the two ends of the cannon 18. In other words, the link device 130 is positioned in a rear part of the cannon 18, where the compressed fluid inlet is made. Thus, the compressed fluid from the tank 21 occupies the rear part of the cannon 18. The compressed fluid then penetrates into the cannon 18 at its end 19 then enters into the hollow part 14 of the projectile 11 to re-emerge therefrom through the vents 15, so as to generate a rotational motion of the projectile 11 on itself as well as a translation of the projectile along the axis X.

Figure 11A:
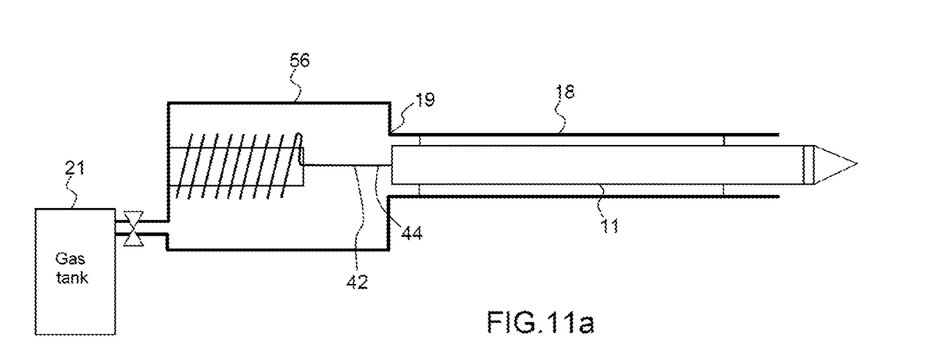
FIGS. 11a and 11b represent a diagram, in cross section in the plane XY, of two embodiments of the link device according to the invention.
Figure 11B:
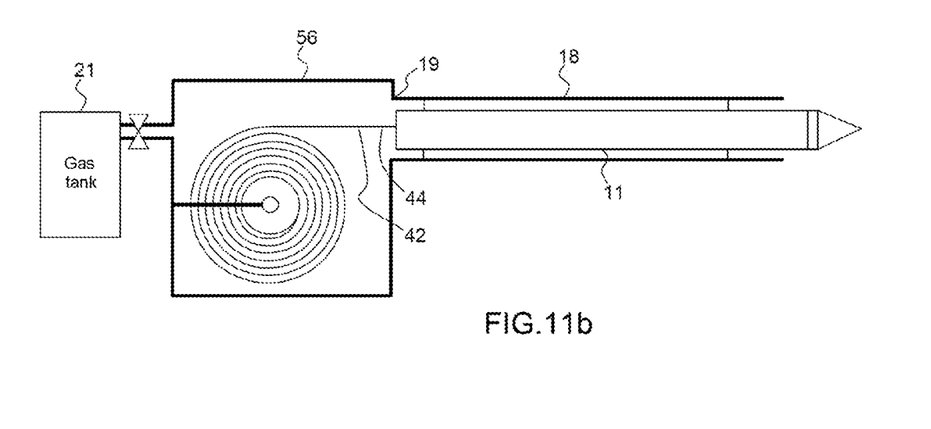

FIGS. 11a and 11b represent a diagram, in cross section in the plane XY, of two embodiments of the link device 130 according to the invention. As explained previously, the link device 130 is positioned in the cannon 18. The end 44 of the strip 42 is fixed to the projectile 11 by the link element 55 (not represented in these figures). In other words, the first object 40 is the cannon 18, the second object 41 is the projectile 11. Thus, the strip 42, while being fixed to the projectile 11, will not disturb its trajectory once the projectile 11 is no longer in the cannon 18. Moreover, since the strip 42 and the projectile are linked in the cannon 18, leak of fluid, and therefore of pressure, cannot occur.

Figure 12:
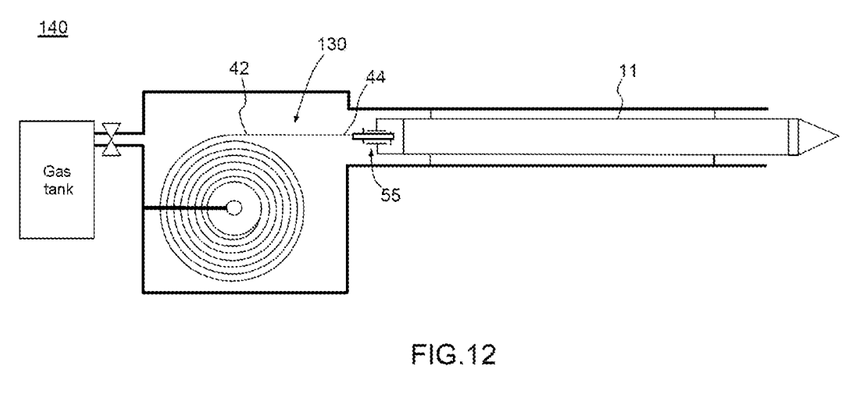
FIG. 12 represents a diagram, in cross section in the plane XY, of a second embodiment of the device for launching a projectile including a link device.

FIG. 12 represents a diagram, in cross section in the plane XY, of a second embodiment of the device 140 for launching a projectile 11 including a link device 130 according to the invention. All the elements of FIG. 12 are identical to the elements of FIG. 11b. This embodiment makes it possible to visualize the link element 55 of the end 44 of the strip 42 and of the projectile 11, as mentioned previously with FIGS. 11a and 11b.

The invention claimed is:

1. An assembly comprising:
   a first object;
   a second object;
   a first strip, capable of passing from a configuration wound about an axis Z about a support fixed to the first object to a configuration deployed along an axis X substantially at right angles to the axis Z, the strip having an end to link the first object to the second object, wherein the end of the first strip is linked to the second object by a link element, and wherein the link element is a mechanical component allowing the rotation of the second object about the axis X; and
   a second strip superposed on the first strip, capable of passing from a configuration wound about the axis Z about the support fixed to the first object to a configuration deployed along the axis X substantially at right angles to the axis Z, the second strip having an end intended to come into contact with a third object, so as to link the first object to the third object.

2. The assembly of claim 1, comprising a first flange and a second flange positioned substantially parallel to the plane XY, on either side of the first strip.

3. The assembly of claim 1, comprising a cover positioned around the first strip.

4. The assembly of claim 1, further comprising a motor having an output shaft along the axis Z linked to the support, intended to wind and deploy the first strip.

5. The assembly of claim 1, comprising a guiding device for the first strip.

6. The assembly of claim 1, comprising a cutting device intended to cut the first strip.

* * * * *